(12) United States Patent
Speckbacher et al.

(10) Patent No.: US 10,094,961 B2
(45) Date of Patent: Oct. 9, 2018

(54) OPTICAL LAYER SYSTEM

(71) Applicant: DR. JOHANNES HEIDENHAIN GmbH, Traunreut (DE)

(72) Inventors: Peter Speckbacher, Kirchweidach (DE); Stefan Funk, Traunstein (DE); Christian Baeuml, Traunwalchen (DE)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 35 days.

(21) Appl. No.: 15/279,439

(22) Filed: Sep. 29, 2016

(65) Prior Publication Data

US 2017/0090079 A1  Mar. 30, 2017

(30) Foreign Application Priority Data

Sep. 29, 2015  (DE) .................. 10 2015 218 702

(51) Int. Cl.
| | | |
|---|---|---|
| *G02B 7/182* | (2006.01) | |
| *G02B 5/18* | (2006.01) | |
| *G01B 11/14* | (2006.01) | |
| *G02B 1/11* | (2015.01) | |
| *G02B 5/08* | (2006.01) | |
| *G02B 1/115* | (2015.01) | |
| *G02B 5/20* | (2006.01) | |
| *G01D 5/38* | (2006.01) | |

(52) U.S. Cl.
CPC .......... *G02B 5/1861* (2013.01); *G01B 11/14* (2013.01); *G02B 1/11* (2013.01); *G02B 1/115* (2013.01); *G02B 5/0816* (2013.01); *G02B 5/0875* (2013.01); *G02B 5/1814* (2013.01); *G02B 5/1819* (2013.01); *G02B 5/201* (2013.01); *G01D 5/38* (2013.01)

(58) Field of Classification Search
CPC ............................. G01B 11/14; G02B 5/1819
USPC ....... 356/305, 328, 482, 486, 491, 498, 614; 359/576, 883, 569
See application file for complete search history.

(56) References Cited

U.S. PATENT DOCUMENTS

| | | | |
|---|---|---|---|
| 4,752,133 A * | 6/1988 | Sommargren | G01D 5/266 356/487 |
| 5,786,931 A | 7/1998 | Speckbacher et al. | |
| 6,621,104 B1 | 9/2003 | Speckbacher et al. | |
| 6,921,177 B2 * | 7/2005 | Schaefer | G02B 5/0808 359/883 |
| 7,379,241 B2 * | 5/2008 | Smith | G02B 5/1809 359/485.04 |
| 7,483,198 B2 * | 1/2009 | Doan | B82Y 30/00 359/291 |
| 8,822,907 B2 | 9/2014 | Joerger et al. | |

(Continued)

FOREIGN PATENT DOCUMENTS

| | | |
|---|---|---|
| DE | 19917950 A1 | 10/2000 |
| DE | 10236788 A1 | 3/2004 |

(Continued)

*Primary Examiner* — Audrey Y Chang

(74) *Attorney, Agent, or Firm* — Leydig, Voit & Mayer, Ltd.

(57) ABSTRACT

An optical layer system for a position-measuring device includes at least first, second and third functional surfaces disposed on a surface of a transparent substrate. Each of the functional surfaces have a different optical function. The functional surfaces are composed of a first layer stack and a second layer stack.

20 Claims, 1 Drawing Sheet

(56) References Cited

U.S. PATENT DOCUMENTS

2004/0090677 A1  5/2004  Allgauer et al.
2012/0112050 A1  5/2012  Joerger et al.
2014/0376002 A1  12/2014  Meissner et al.

FOREIGN PATENT DOCUMENTS

| DE | 102005020944 A1 | 12/2005 |
| EP | 0742455 A1 | 11/1996 |
| EP | 2450673 B1 | 5/2012 |
| EP | 2816316 A1 | 12/2014 |

* cited by examiner

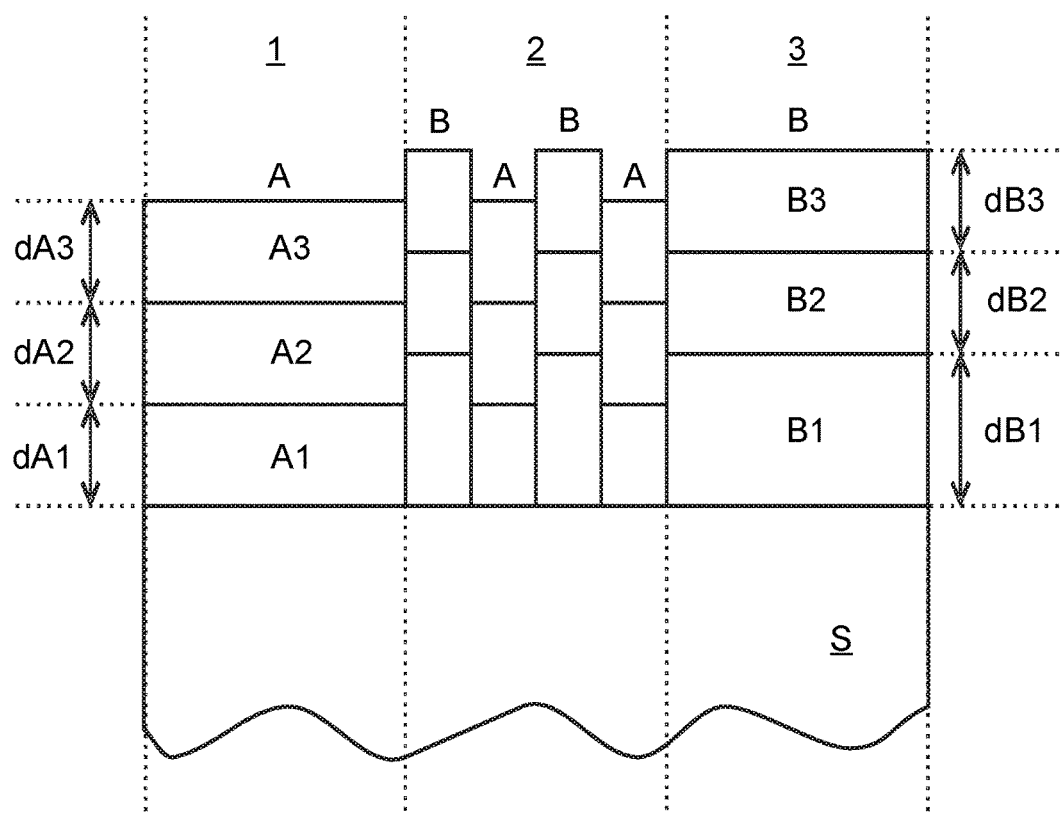

OPTICAL LAYER SYSTEM

CROSS-REFERENCE TO PRIOR APPLICATION

Priority is claimed to German Patent Application No. DE 10 2015 218 702.0, filed on Sep. 29, 2015, the entire disclosure of which is hereby incorporated by reference herein.

FIELD

The present invention relates to an optical layer system for a position-measuring device. Such layer systems perform different functions in the shaping, transmission and analysis of light beams for scanning optical material measures in a position-measuring device.

BACKGROUND

EP 2450673 B1 describes an optical position-measuring device that is based on scanning a material measure with light. To this end, light from a light source in a scanning head is passed through a transparent scanning reticle onto a scale, reflected back therefrom to the scanning head and detected in a sensor unit. By analyzing the sensor signals, highly accurate position values are determined which are indicative of the displacement to be measured between the scanning head and the material measure. For certain functions, it is even necessary that the light impinge on the material measure several times. Therefore, the scanning reticle is provided on both its top side and on its underside with different functional surfaces that act as a reflector or mirror or as grating structures (e.g., in the form of diffraction gratings or diffractive lenses) as well as surfaces that are provided with an antireflection coating to absorb disturbing scattered light inside and outside of the scanning reticle.

Mirrors may be produced, for example, by vapor deposition of metals on the transparent substrate of a scanning reticle. Also possible are dielectric mirrors which have a reflective effect obtained by a combination of layers having refractive indices and thicknesses that are carefully selected and matched to the wavelength of the light used.

Optical gratings may take the form of phase gratings which are composed of two alternately arranged reflective layers, one of which having an optically retarding spacer layer that causes a 180 degree phase shift toward the zeroth diffraction order. In contrast, amplitude gratings are based on alternating bright and dark regions, such as, for example, in a structured metallic layer. Examples of optical gratings and their application in position-measuring devices are disclosed in EP 0742455 A1 (phase grating) and DE 10236788 A1 (amplitude grating).

On the other hand, antireflection coatings are composed of layers that have different optical densities and absorb scattered light.

The manufacture of such layers or layer stacks having a wide variety of different functions is complex technologically and from a process point of view. Each layer must meet the highest quality standards to ultimately enable as accurate a position measurement as possible.

SUMMARY

In an embodiment, the present invention provides an optical layer system for a position-measuring device. At least first, second and third functional surfaces are disposed on a surface of a transparent substrate. Each of the functional surfaces have a different optical function. The functional surfaces are composed of a first layer stack and a second layer stack.

BRIEF DESCRIPTION OF THE DRAWINGS

The present invention will be described in even greater detail below based on the exemplary FIGURE. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following:

FIG. 1 shows an optical layer system for a position-measuring device according to an embodiment of the present invention.

DETAILED DESCRIPTION

In an embodiment, the present invention provides an optical layer system for a position-measuring device, which optical layer system makes it possible to satisfy a wide variety of different requirements, yet requires a minimum of manufacturing effort.

According to an embodiment, an optical layer system is provided for a position-measuring device, whereby at least a first, second and third functional surfaces that each have a different optical function can be provided on a surface of a transparent substrate. These functional surfaces are composed of a first layer stack and a second layer stack.

The first functional surface is formed by the first layer stack over its entire area and acts as an antireflection coating, while the third functional surface is formed by the second layer stack over its entire area and acts as a mirror.

The second functional surface acts as an optical grating because the two layer stacks are periodically alternately arranged at intervals of less than 1 mm, preferably less than 50 µm, and particularly preferably less than 20 µm. The optical grating, in conjunction with the light used in the position-measuring device, produces diffraction effects. These diffraction effects cause the light incident on the grating to split into different diffraction orders having different directions and intensities. Such gratings, whose periodicity and grating vector may vary locally, can be used to implement a wide variety of optical functions, such as, for example, diffractive lenses.

FIG. 1 illustrates an optical layer system for a position-measuring device.

A transparent substrate S has provided thereon three different functional surfaces 1, 2, 3 that perform different functions in the scanning beam path of a position-measuring device.

For example, first functional surface 1 is an antireflection coating for suppressing and absorbing unwanted scattered light inside and outside of the scanning reticle.

Second functional surface 2 constitutes an optical grating whose periodic structure interacts with the incident light. The optical grating may be a phase grating or an amplitude grating. In order to achieve the desired optical effect, a variable grating period and a variable direction of the grating period are also conceivable. This means that the lines of the grating may be curved, for example in order to achieve beam focusing. Such gratings may be used, for example, to detect a reference mark on the scale of the position-measuring device, thereby making it possible to determine an absolute position from where displacements between the scale and the scanning head can be measured based on periodic signals.

Third functional surface 3 acts as a mirror and reflects light incident from substrate S. This effect may be achieved by a metallic mirror or a dielectric mirror, as will be described in greater detail in separate exemplary embodiments.

In accordance with the present invention, the three functional surfaces 1, 2, 3 are formed by an optical layer system including exactly only two different layer stacks, namely a first layer stack A and a second layer stack B.

First functional surface 1 (i.e., the antireflection coating) is formed by first layer stack A over its entire area, while third functional surface 3 (i.e., the mirror) is formed by second layer stack B over its entire area.

Second functional surface 2 (i.e., the optical grating) is formed by a periodic alternating arrangement of the two layer stacks A, B. The arrangement of the two layer stacks A, B may be periodic in one direction (e.g., line grating) or periodic in two directions (e.g., checkerboard pattern or cross grating). It is also possible to produce diffractive lenses having any desired diffracting structures from a suitable sequence of the two layer stacks A, B.

Thus, although three greatly different functional surfaces 1, 2, 3 are available, the effort required for manufacturing such a substrate S with an optical layer system is reduced to applying only two different layer stacks A, B in a suitable spatial distribution on this substrate S using generally known techniques (such as deposition of layers, photolithography, etching, lift-off processes, etc.).

An application that will be discussed by way of example is the use of the optical layer system in a scanning reticle of a position-measuring device having a scale and a scanning head, such as is described in the above-mentioned EP 2450673 B1. What is discussed here is in particular the scanning reticle's upper side, which faces away from the scale and where the light coming from substrate S strikes its interface with the surrounding medium, i.e., the layer stacks A, B disposed on this interface.

The individual layers of layer stacks A, B are designated A1, A2, A3 and B1, B2, B3, in each case beginning with the first layer A1, respectively B1, disposed directly on substrate S. The thicknesses of these layers are accordingly designated dA1, dA2, dA3, dB1, dB2, dB3. The refractive indices of the respective layers are designated nA1, nA2, nA3, nB1, nB2, nB3, the refractive index of substrate S is designated nS, and the refractive index of the ambient medium is designated nU.

For the sake of easy understanding, the following discussion is based on the assumption of a normally incident light beam and layers having a purely real refractive index n. Multiple reflections are disregarded.

With regard to an optimized antireflection coating, the following considerations apply:

In order to obtain a phase deviation of π of the light between the reflections at the interfaces between S and A1 and between A1 and A2, it should hold that $$dA1=L/(4*nA1) \tag{1.1}$$

$$nS<nA1<nA2 \tag{1.2}$$

For minimum reflection, it should also ideally hold that $$nA1=SQR(nS*nA2) \tag{1.3}$$

Layer A3 is optional and provides an antireflection coating toward the surrounding medium (nU=1) of the scanning reticle. Here, it should ideally hold that $$dA1=L/(4*nA1) \tag{1.4}$$

$$nU<nA3<nA2 \tag{1.5}$$

$$nA3=SQR(nU*nA2) \tag{1.6}$$

As for the third functional surface 3 acting as a mirror; i.e., second layer stack B, a distinction is made between a metallic mirror and a dielectric mirror.

In the case of a metallic mirror, layer B1 is composed of a metal. Layer B2 merely serves to protect layer B1 from damage and to cover layer B1. Layer B3 is omitted and corresponds to the surrounding medium.

For a dielectric mirror, a path difference of one full wavelength is to be obtained for the reflections at each of the interfaces between S and B1, between B1 and B2, and between B2 and B3. From this, the following is derived:

$$dB1=L/(4*nB1) \tag{2.1}$$

$$dB2=L/(4*nB2) \tag{2.2}$$

$$nS<nB1>nB2 \tag{2.3}$$

Finally, a second functional surface 2 configured as a phase grating will be discussed. Phase gratings are preferred over amplitude gratings because of their higher diffraction efficiency (i.e., the portion of incident radiation that is diffracted into the first diffraction order).

In order to suppress the usually unwanted zeroth diffraction order, a phase difference of 180 degrees should exist between the light reflected at the junction between S and B1 and the light reflected at the junction between A1 and A2. Thus, it should hold that $$dA1=L/(4*nA1) \tag{3.1}$$

A maximum possible diffraction efficiency is achieved if it holds that $$nS=nA1 \tag{3.2}$$

and also that $$(nS-nB1)/(nS+nB1)=(nA1-nA2)/(nA1+nA2) \tag{3.3}$$

The following will discuss the combination of an antireflection coating, a phase grating and a mirror which are composed only of the two layer stacks A and B, but which are intended to satisfy as far as possible the boundary conditions for the discussed functional surfaces 1, 2, 3.

The conditions of equations (1.1) and (3.1) are identical and, therefore, can in any case be satisfied simultaneously. The conditions of equations (1.2) and (3.2) cannot be satisfied simultaneously. If equation (3.2) were satisfied, there would be no antireflection coating anymore, but if equation (1.2) is satisfied, a phase grating is still possible and, therefore, preference is given to equation (1.2).

A metallic mirror is always possible, regardless of the conditions mentioned. For a dielectric mirror, equations (2.1), (2.2), (2.3) must be satisfied.

Based on these considerations, and through numerous trials and simulation calculations, different specific exemplary embodiments have been found for the general concept underlying the present invention. These will be described below. The respective layer thicknesses are dependent on the wavelength of the light used in the position-measuring device and can be approximately determined using the above equations. The specified typical refractive index is given for a wavelength of about 1000 nm. The simulation was based on the assumption that linearly polarized light is incident normally on a linear grating having an optimized line width (width-to-gap ratio for maximum intensity of the first diffraction order).

First, particularly preferred exemplary embodiment, based on a metallic mirror having a gold layer B1:

| Layer | Material | Refractive index |
|---|---|---|
| S | ZERODUR | 1.53 |
| A1 | $Cr_2O_3$ | 2.25 + i0.01 |
| A2 | Cr | 3.10 + i1.20 |
| A3 | $Cr_2O_3$ | 2.25 + i0.01 |
| B1 | Au | 0.28 + i6.81 |
| B2 | Cr | 3.10 + i1.20 |
| B3 | — | 1.00 |

For this layer system, given a grating period of 20 μm, the maximum first-order diffraction efficiency of the phase grating is 17%, while the zeroth diffraction order still contains 11% of the incident light. This is a significant improvement over a pure amplitude grating that has a gold layer and whose first-order diffraction efficiency is 14%. The reflectivity of the antireflection coating is 9%; the reflectivity of the mirror is 96%.

First layer B1 in second layer stack B is a gold layer which is covered by a second layer B2 of chromium for protection thereof. Alternatively, first layer B1 may be made, for example, from aluminum or silver. A third layer B3 is not needed here; second (chromium) layer B2 is followed by the surrounding medium, which has a refractive index of 1.

In this and all other exemplary embodiments, the substrate S used is a transparent glass-ceramic with as low an expansion coefficient as possible. Thus, the scanning reticle substantially retains its shape, even during temperature changes. Such glass-ceramics are known, for example, under the trade name ZERODUR. Other optical glass bodies, such as quartz (e.g., HERASIL, SUPRASIL, ULE) are also possible.

For a wavelength of 1000 nm of the light used for scanning, the following values are obtained for the individual layer thicknesses: A1 90 nm, A2 100 nm, A3 90 nm, B1 80 nm, B2 100 nm. 10 nm is a reasonable range of accuracy for the dielectric layers. In case of the layers B1, B2 of the metallic mirror or the purely protective layers on the rear side of the metallic mirrors, the thickness may also vary to a much greater extent.

Second exemplary embodiment, based on a dielectric mirror:

| Layer | Material | Refractive index |
|---|---|---|
| S | ZERODUR | 1.53 |
| A1 | $Cr_2O_3$ | 2.25 + i0.01 |
| A2 | Cr | 3.10 + i1.20 |
| A3 | $Cr_2O_3$ | 2.25 + i0.01 |
| B1 | Si | 3.57 |
| B2 | $SiO_2$ | 1.44 |
| B3 | Si | 3.57 |

For this layer system, given a grating period of 20 μm, the maximum first-order diffraction efficiency of the phase grating is 15%, while the zeroth diffraction order still contains 11% of the incident light. The reflectivity of the antireflection coating is 7%; the reflectivity of the mirror is 87%.

Third exemplary embodiment, based on a metallic mirror:

| Layer | Material | Typical refractive index |
|---|---|---|
| Sub | ZERODUR | 1.53 |
| A1 | Si | 3.57 |
| A2 | Al | 1.51 + i9.26 |
| A3 | Si | 3.57 |
| B1 | Au | 0.28 + i6.18 |
| B2 | Cr | 3.10 + i1.20 |
| B3 | — | 1.00 |

For this layer system, given a grating period of 20 μm, the maximum first-order diffraction efficiency of the phase grating is 31%, while the zeroth diffraction order still contains 1% of the incident light. The reflectivity of the antireflection coating is 60%; the reflectivity of the mirror is 96%.

Fourth exemplary embodiment, based on a dielectric mirror:

| Layer | Material | Refractive index |
|---|---|---|
| Sub | ZERODUR | 1.53 |
| A1 | $TiO_2$ | 2.43 |
| A2 | Ti | 3.37 + i3.24 |
| A3 | $TiO_2$ | 2.43 |
| B1 | $TiO_2$ | 2.43 |
| B2 | $SiO_2$ | 1.44 |
| B3 | Ti | 3.37 + i3.24 |

For this layer system, given a grating period of 20 μm, the maximum first-order diffraction efficiency of the phase grating is 12%, while the zeroth diffraction order still contains 8% of the incident light. The reflectivity of the antireflection coating is 13%; the reflectivity of the mirror is 65%.

Fifth exemplary embodiment, based on a dielectric mirror:

| Layer | Material | Refractive index |
|---|---|---|
| Sub | ZERODUR | 1.53 |
| A1 | $TiO_2$ | 2.43 |
| A2 | Ti | 3.37 + i3.24 |
| A3 | $TiO_2$ | 2.43 |
| B1 | Au | 0.28 + i6.18 |
| B2 | Cr | 3.10 + i1.20 |
| B3 | — | 1.00 |

For this layer system, given a grating period of 20 μm, the maximum first-order diffraction efficiency of the phase grating is 18%, while the zeroth diffraction order still contains 6% of the incident light. The reflectivity of the antireflection coating is 14%; the reflectivity of the mirror is 96%.

Sixth exemplary embodiment, based on a dielectric mirror:

| Layer | Material | Refractive index |
|---|---|---|
| Sub | ZERODUR | 1.53 |
| A1 | $Ta_2O_5$ | 2.10 |
| A2 | Ta | 0.98 + i4.89 |
| A3 | $Ta_2O_5$ | 2.10 |
| B1 | $Ta_2O_5$ | 2.10 |
| B2 | $SiO_2$ | 1.44 |
| B3 | Ta | 0.98 + i4.89 |

For this layer system, given a grating period of 20 μm, the maximum first-order diffraction efficiency of the phase grating is 31%, while the zeroth diffraction order still contains 3% of the incident light. The reflectivity of the antireflection coating is 68%; the reflectivity of the mirror is 87%.

Seventh exemplary embodiment, based on a metallic mirror:

| Layer | Material | Refractive index |
|-------|----------|------------------|
| Sub   | ZERODUR  | 1.53             |
| A1    | $Ta_2O_5$ | 2.10            |
| A2    | Ta       | $0.98 + i4.89$   |
| A3    | $Ta_2O_5$ | 2.10            |
| B1    | Au       | $0.28 + i6.81$   |
| B2    | Cr       | $3.10 + i1.20$   |
| B3    | —        | 1.00             |

For this layer system, given a grating period of 20 μm, the maximum first-order diffraction efficiency of the phase grating is 32%, while the zeroth diffraction order still contains 2% of the incident light. The reflectivity of the antireflection coating is 62%; the reflectivity of the mirror is 96%.

As is apparent from the numerous exemplary embodiments, the principle of producing three functional surfaces 1, 2, 3 with only two layer stacks A, B inevitably leads to compromises. Nevertheless it is possible to find, among many different options, a suitable combination that, in each case, achieves particularly well the most urgently required properties (diffraction efficiency of the grating, reflectivity of the antireflection coating and mirror) and is good enough with respect to the remaining properties. Embodiments of the present invention simplify the manufacture of a multi-functional optical layer system with good diffraction efficiencies of the phase grating.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An optical layer system for a position-measuring device, comprising:
    at least first, second and third functional surfaces disposed on a surface of a transparent substrate, each of the functional surfaces having a different optical function, wherein the functional surfaces are composed of a first layer stack and a second layer stack,
    wherein the first functional surface is formed by the first layer stack and acts as an antireflection coating, and the third functional surface is formed by the second layer stack and acts as a mirror, and
    wherein the second functional surface is formed by the first and second layer stacks being alternately arranged with respect to each other at intervals of less than 1 mm so as to act as an optical grating.

2. The optical layer system as recited in claim 1, wherein the first and second layer stacks are alternately arranged at intervals of less than 50 μm.

3. The optical layer system as recited in claim 1, wherein the first and second layer stacks are alternately arranged at intervals of less than 20 μm.

4. The optical layer system as recited in claim 1, wherein the second functional surface is a phase grating.

5. The optical layer system as recited in claim 1, wherein the third functional surface is configured as a metallic mirror, and the second layer stack includes exactly two layers.

6. The optical layer system as recited in claim 5, wherein the second layer stack is composed of a first layer of one of gold, aluminum or silver, that is disposed on the substrate, and a second layer of chromium that is disposed on the first layer.

7. The optical layer system as recited in claim 6, wherein the first layer has a thickness of about 80 nm.

8. The optical layer system as recited in claim 1, wherein the first layer stack is composed of:
    a first layer of chromium oxide disposed on the substrate,
    a second layer of chromium, and a
    third layer of chromium oxide.

9. The optical layer system as recited in claim 8, wherein the first layer and the third layer have a thickness of about 90 nm, and the second layer has a thickness of about 100 nm.

10. The optical layer system as recited in claim 1, wherein the third functional surface is configured as a dielectric mirror.

11. A position-measuring device having a material measure and a scanning head, wherein the scanning head includes a scanning reticle having an optical layer system according to claim 1.

12. The position-measuring device as recited in claim 11, wherein the second functional surface is configured to be used to scan a reference mark on the material measure.

13. An optical layer system for a position-measuring device, comprising:
    at least first, second and third functional surfaces disposed on a surface of a transparent substrate, each of the functional surfaces having a different optical function, wherein the functional surfaces are composed of a first layer stack and/or a second layer stack,
    wherein the second functional surface is formed by the first and second layer stacks being alternately arranged with respect to each other at intervals of less than 1 mm so as to act as an optical grating.

14. The optical layer system as recited in claim 13, wherein the first and second layer stacks are alternately arranged at intervals of less than 50 μm.

15. The optical layer system as recited in claim 13, wherein the first and second layer stacks are alternately arranged at intervals of less than 20 μm.

16. The optical layer system as recited in claim 13, wherein the second functional surface is a phase grating.

17. The optical layer system as recited in claim 13, wherein the third functional surface is configured as a metallic mirror, and the second layer stack includes exactly two layers.

18. The optical layer system as recited in claim 17, wherein the second layer stack is composed of a first layer of one of gold, aluminum or silver, that is disposed on the substrate, and a second layer of chromium that is disposed on the first layer.

19. The optical layer system as recited in claim 13, wherein the first layer stack is composed of:
a first layer of chromium oxide disposed on the substrate,
a second layer of chromium, and a
third layer of chromium oxide.

20. The optical layer system as recited in claim 13, wherein the third functional surface is configured as a dielectric mirror.

\* \* \* \* \*